United States Patent
Sani

(10) Patent No.: US 9,777,537 B1
(45) Date of Patent: Oct. 3, 2017

(54) POLYCRYSTALLINE DIAMOND COMPACTS

(71) Applicant: US SYNTHETIC CORPORATION, Orem, UT (US)

(72) Inventor: Mohammad N. Sani, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 154 days.

(21) Appl. No.: 14/569,039

(22) Filed: Dec. 12, 2014

Related U.S. Application Data

(60) Division of application No. 12/245,573, filed on Oct. 3, 2008, now Pat. No. 8,986,408, which is a continuation-in-part of application No. 12/111,769, filed on Apr. 29, 2008, now Pat. No. 7,842,111.

(51) Int. Cl.
| | | |
|---|---|---|
| *C09C 1/68* | (2006.01) | |
| *C09K 3/14* | (2006.01) | |
| *B24D 3/02* | (2006.01) | |
| *E21B 10/55* | (2006.01) | |
| *B24D 18/00* | (2006.01) | |
| *B24D 99/00* | (2010.01) | |
| *E21B 10/56* | (2006.01) | |

(52) U.S. Cl.
CPC .......... *E21B 10/55* (2013.01); *B24D 18/0009* (2013.01); *B24D 99/005* (2013.01); *E21B 10/56* (2013.01)

(58) Field of Classification Search
None
See application file for complete search history.

(56) References Cited

U.S. PATENT DOCUMENTS

| | | | |
|---|---|---|---|
| 3,745,623 | A | 7/1973 | Wentorf, Jr. et al. |
| 4,104,441 | A | 8/1978 | Fedoseev et al. |
| 4,246,005 | A | 1/1981 | Ishizuka |
| 4,268,276 | A | 5/1981 | Bovenkerk |
| 4,274,900 | A | 6/1981 | Mueller et al. |
| 4,410,054 | A | 10/1983 | Nagel et al. |

(Continued)

FOREIGN PATENT DOCUMENTS

| | | |
|---|---|---|
| DE | 268888 A | 6/1989 |
| EP | 0715930 | 6/1996 |

(Continued)

OTHER PUBLICATIONS

U.S. Appl. No. 12/912,273, filed Oct. 26, 2010, Sani.

(Continued)

*Primary Examiner* — Kaj K Olsen
*Assistant Examiner* — Ross J Christie
(74) *Attorney, Agent, or Firm* — Dorsey & Whitney LLP

(57) ABSTRACT

Embodiments of the invention relate to polycrystalline diamond ("PCD") fabricated by sintering a mixture including diamond particles and a selected amount of graphite particles, polycrystalline diamond compacts ("PDCs") having a PCD table comprising such PCD, and methods of fabricating such PCD and PDCs. In an embodiment, a method includes providing a mixture including graphite particles present in an amount of about 0.1 weight percent ("wt %") to about 20 wt % and diamond particles. The method further includes subjecting the mixture to a high-pressure/high-temperature process sufficient to form PCD.

6 Claims, 10 Drawing Sheets

(56) References Cited

U.S. PATENT DOCUMENTS

| | | | |
|---|---|---|---|
| 4,425,315 A | 1/1984 | Tsuji et al. | |
| 4,468,138 A | 8/1984 | Nagel | |
| 4,560,014 A | 12/1985 | Geczy | |
| 4,636,253 A | 1/1987 | Nakai et al. | |
| 4,738,322 A | 4/1988 | Hall et al. | |
| 4,797,241 A * | 1/1989 | Peterson | B01J 3/062 51/307 |
| 4,811,801 A | 3/1989 | Salesky et al. | |
| 4,850,523 A | 7/1989 | Slutz | |
| 4,913,247 A | 4/1990 | Jones | |
| 5,016,718 A | 5/1991 | Tandberg | |
| 5,087,435 A | 2/1992 | Potter et al. | |
| 5,092,687 A | 3/1992 | Hall | |
| 5,120,327 A | 6/1992 | Dennis | |
| 5,128,080 A | 7/1992 | Jurewicz et al. | |
| 5,135,061 A | 8/1992 | Newton, Jr. | |
| 5,154,245 A | 10/1992 | Waldenstrom et al. | |
| 5,209,916 A | 5/1993 | Gruen | |
| 5,328,676 A | 7/1994 | Gruen | |
| 5,364,192 A | 11/1994 | Damm et al. | |
| 5,368,398 A | 11/1994 | Damm et al. | |
| 5,370,855 A | 12/1994 | Gruen | |
| 5,449,491 A | 9/1995 | Job | |
| 5,460,233 A | 10/1995 | Meany et al. | |
| 5,462,776 A | 10/1995 | Gruen | |
| 5,467,836 A | 11/1995 | Grimes et al. | |
| 5,480,233 A | 1/1996 | Cunningham | |
| 5,544,713 A | 8/1996 | Dennis | |
| 5,620,512 A | 4/1997 | Gruen et al. | |
| 5,759,216 A | 6/1998 | Kanada et al. | |
| 5,855,996 A | 1/1999 | Corrigan et al. | |
| 5,900,225 A | 5/1999 | Mistry et al. | |
| 5,912,217 A * | 6/1999 | Sumiya | B01J 3/062 51/307 |
| 5,954,147 A | 9/1999 | Overstreet et al. | |
| 6,214,079 B1 | 4/2001 | Kear et al. | |
| 6,398,815 B1 | 6/2002 | Pope et al. | |
| 6,544,308 B2 | 4/2003 | Griffin et al. | |
| 6,783,745 B1 | 8/2004 | Voronov et al. | |
| 6,793,681 B1 | 9/2004 | Pope et al. | |
| 6,800,095 B1 | 10/2004 | Pope et al. | |
| 6,883,623 B2 | 4/2005 | McCormick et al. | |
| 7,048,081 B2 | 5/2006 | Smith et al. | |
| 7,060,641 B2 | 6/2006 | Qian et al. | |
| 7,070,635 B2 | 7/2006 | Frushour | |
| 7,350,599 B2 | 4/2008 | Lockwood et al. | |
| 7,516,804 B2 | 4/2009 | Vail | |
| 7,517,588 B2 | 4/2009 | Frushour | |
| 7,569,176 B2 | 8/2009 | Pope et al. | |
| 7,635,035 B1 | 12/2009 | Bertagnolli et al. | |
| 7,841,428 B2 | 11/2010 | Bertagnolli | |
| 7,842,111 B1 | 11/2010 | Sani | |
| 7,972,397 B2 | 7/2011 | Vail | |
| 8,246,701 B2 | 8/2012 | Vail | |
| 8,501,144 B1 | 8/2013 | Bertagnolli | |
| 8,734,550 B1 | 5/2014 | Sani | |
| 8,986,408 B1 | 3/2015 | Sani | |
| 2004/0011433 A1 | 1/2004 | Shiozaki et al. | |
| 2004/0057896 A1 | 3/2004 | Kronholm et al. | |
| 2005/0002851 A1 | 1/2005 | McElrath et al. | |
| 2005/0019114 A1 | 1/2005 | Sung | |
| 2005/0133277 A1 | 6/2005 | Dixon | |
| 2005/0186104 A1 | 8/2005 | Kear et al. | |
| 2005/0227590 A1 | 10/2005 | Sung | |
| 2006/0016127 A1 | 1/2006 | Sung | |
| 2006/0042172 A1 | 3/2006 | Sung | |
| 2006/0060390 A1 | 3/2006 | Eyre | |
| 2006/0060392 A1 | 3/2006 | Eyre | |
| 2006/0086540 A1 | 4/2006 | Griffin et al. | |
| 2006/0147644 A1 | 7/2006 | Fujimura et al. | |
| 2006/0157285 A1 | 7/2006 | Cannon et al. | |
| 2006/0266559 A1 | 11/2006 | Keshavan et al. | |
| 2007/0056778 A1 | 3/2007 | Webb et al. | |
| 2007/0144790 A1 | 6/2007 | Fang et al. | |
| 2007/0187153 A1 | 8/2007 | Bertagnolli | |
| 2007/0234646 A1 | 10/2007 | Can et al. | |
| 2007/0272448 A1 | 11/2007 | Griffo | |
| 2008/0085407 A1 | 4/2008 | Cooley et al. | |
| 2008/0115424 A1 | 5/2008 | Can et al. | |
| 2009/0152015 A1 | 6/2009 | Sani et al. | |
| 2009/0178345 A1 | 7/2009 | Russell et al. | |
| 2009/0305039 A1 * | 12/2009 | Sumiya | B01J 3/062 428/402 |
| 2010/0104874 A1 | 4/2010 | Yong et al. | |
| 2012/0267174 A1 | 10/2012 | Vail | |
| 2013/0269263 A1 | 10/2013 | Vail | |

FOREIGN PATENT DOCUMENTS

| | | |
|---|---|---|
| FR | 2684090 | 5/1993 |
| RU | 2131763 | 6/1999 |
| WO | WO99/10274 | 3/1999 |
| WO | WO2008/094190 | 8/2008 |

OTHER PUBLICATIONS

Akaishi, Minoru, Yoiciro Sato, Nobuo Setaka, Masayuki Tsutsumi, Toshikazu Ohsawa and Osamu Fukunaga, "Effect of Additive Graphite on Sitering of Diamond", Cermaic Bulletin, vol. 62, No. 6 (1983) pp. 689-694.

Asbury Carbons, "Amorphous Graphite", http://asbury.com/Amorphous-Graphite.html (Mar. 28, 2008) (May 16, 2012) (obtainied via Internet Archive Wayback Machine).

Davidenko, V.M, S.V. Kidalov, F.M. Shakhov, M.A. Yagovkina, V.A. Yashin, V.Ya.Vul, "Fullerenes as a co-catalyst for high pressure-high temperature synthesis of diamonds", Diamond and Related Materials 13 (2004) pp. 2203-2206.

Kidalov,S.V., V.I. Sokolov, F.M. Shakhov and A. YA. Vul', "Mechanism of the Catalytic Effect of Fullerenes on the Graphite-Diamond Phase Transition at High Temperature and Pressure", Doklady Physical Chemistry, vol. 404, Part 1, (2005) pp. 179-181.

Vul, A. YA, V.M. Davidenko, S.V. Kidalov, S.S. Ordan'Yan and V.A. Yashin, "Fullereness Catalyze the Graphite-Diamond Phase Transition", Technical Physics Letters, vol. 27, No. 5, 2001, pp. 384-386.

Vul, A. YA, S.V. Kidalov, V.M. Davidenko, V.A. Yashin, S.S. Ordanyan, "Fullerness as a co-catalyst for HPHT Synthesis of Diamond", Proceedings of the Sixth Applied Diamond Conference/Second (2001) pp. 237-238.

Yushin, G.N. et al., "Effect of sintering in structure of nanodiamond," Diamond and Related Materials, Aug. 10, 2005, vol. 14, pp. 1721-1729.

International Search Report and Written Opinion from International Application No. PCT/US2007/016322 dated Oct. 17, 2008.

U.S. Appl. No. 11/496,905, Apr. 17, 2008, Office Action.
U.S. Appl. No. 11/496,905, Oct. 30, 2008, Office Action.
U.S. Appl. No. 11/496,905, Jan. 15, 2009, Notice of Allowance.
U.S. Appl. No. 11/496,905, Mar. 25, 2009, Issue Notification.
U.S. Appl. No. 11/351,564, May 27, 2008, Office Action.
U.S. Appl. No. 11/351,564, Sep. 17, 2008, Office Action.
U.S. Appl. No. 11/351,564, Mar. 4, 2009, Office Action.
U.S. Appl. No. 11/351,564, Jun. 24, 2009, Office Action.
U.S. Appl. No. 11/351,564, Dec. 30, 2009, Notice of Allowance.
U.S. Appl. No. 11/351,564, Apr. 15, 2010, Notice of Allowance.
U.S. Appl. No. 11/351,564, Jul. 21, 2010, Notice of Allowance.
U.S. Appl. No. 11/351,564, Nov. 10, 2010, Issue Notification.
U.S. Appl. No. 12/111,769, Dec. 23, 2009, Office Action.
U.S. Appl. No. 12/111,769, Mar. 11, 2010, Office Action.
U.S. Appl. No. 12/111,769, Jul. 28, 2010, Notice of Allowance.
U.S. Appl. No. 12/111,769, Aug. 20, 2010, Notice of Allowance.
U.S. Appl. No. 12/111,769, Nov. 10, 2010, Issue Notification.
U.S. Appl. No. 12/394,594, Oct. 1, 2010, Office Action.
U.S. Appl. No. 12/394,594, Dec. 22, 2010, Office Action.
U.S. Appl. No. 12/394,594, Mar. 31, 2011, Notice of Allowance.
U.S. Appl. No. 12/394,594, Jun. 15, 2011, Issue Notification.
U.S. Appl. No. 12/245,573, Jun. 17, 2011, Office Action.
U.S. Appl. No. 12/245,573, Oct. 26, 2011, Office Action.
U.S. Appl. No. 12/245,573, Jun. 11, 2012, Office Action.

(56) References Cited

OTHER PUBLICATIONS

U.S. Appl. No. 12/245,573, Feb. 6, 2014, Office Action.
U.S. Appl. No. 12/245,573, Sep. 10, 2014, Notice of Allowance.
U.S. Appl. No. 12/909,716, Feb. 14, 2012, Office Action.
U.S. Appl. No. 13/116,511, Dec. 9, 2011, Office Action.
U.S. Appl. No. 13/116,511, Mar. 30, 2012, Notice of Allowance.
U.S. Appl. No. 12/912,273, Oct. 25, 2013, Notice of Allowance.
U.S. Appl. No. 12/912,273, Mar. 3, 2014, Notice of Allowance.
U.S. Appl. No. 12/912,273, Apr. 8, 2014, Notice of Allowance.
U.S. Appl. No. 12/912,273, May 7, 2014, Issue Notification.
U.S. Appl. No. 13/533,026, Dec. 6, 2013, Office Action.
U.S. Appl. No. 13/533,026, Sep. 15, 2014, Notice of Allowance.
U.S. Appl. No. 12/245,573, Mar. 4, 2015, Issue Notification.
U.S. Appl. No. 13/533,026, Dec. 30, 2014, Issue Notification.
U.S. Appl. No. 13/912,433, Oct. 23, 2015, Office Action.
U.S. Appl. No. 13/912,433, May 10, 2016, Notice of Allowance.
U.S. Appl. No. 13/912,433, Aug. 11, 2016, Supplemental Notice of Allowance.
U.S. Appl. No. 13/912,433, Aug. 17, 2016, Issue Notification.

\* cited by examiner

POLYCRYSTALLINE DIAMOND COMPACTS

CROSS-REFERENCE TO RELATED APPLICATIONS

This application is division of U.S. patent application Ser. No. 12/245,573 filed on 3 Oct. 2008, which is a continuation-in-part of U.S. patent application Ser. No. 12/111,769 filed on 29 Apr. 2008, now U.S. Pat. No. 7,842,111 issued on 30 Nov. 2010. The disclosure of each of the foregoing applications is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller cone drill bits and fixed cutter drill bits. A PDC cutting element typically includes a superabrasive diamond layer commonly referred to as a diamond table. The diamond table is formed and bonded to a substrate using a high-pressure/high-temperature ("HPHT") process. The PDC cutting element may also be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container with a volume of diamond particles positioned on a surface of the cemented-carbide substrate. A number of such cartridges may be loaded into a HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a solvent catalyst to promote intergrowth between the diamond particles, which results in formation of bonded diamond grains defining a matrix of PCD with interstitial regions between the bonded diamond grains being occupied by the cobalt infiltrated from the substrate. Often, a solvent catalyst may be mixed with the diamond particles prior to subjecting the diamond particles and substrate to the HPHT process.

The presence of the solvent catalyst in the PCD table is believed to reduce the thermal stability of the PCD table at elevated temperatures. For example, the difference in thermal expansion coefficient between the diamond grains and solvent catalyst is believed to lead to chipping or cracking of the PCD table during drilling or cutting operations, which can degrade the mechanical properties of the PCD table or cause failure. Additionally, some of the diamond grains can undergo a chemical breakdown or back-conversion to graphite via interaction with the solvent catalyst. At elevated high temperatures, portions of diamond grains may transform to carbon monoxide, carbon dioxide, graphite, or combinations thereof, thus, degrading the mechanical properties of the PCD table.

One conventional approach for improving the thermal stability of PDCs is to at least partially remove the solvent catalyst from the PCD table of the PDC by acid leaching. However, removing the solvent catalyst from the PCD table can be relatively time consuming for high-volume manufacturing.

Therefore, manufacturers and users of PCD continue to seek improved thermally-stable PCD and processing techniques for such thermally-stable PCD.

SUMMARY

Embodiments of the invention relate to PCD fabricated by subjecting a mixture including diamond particles and a selected amount of graphite particles to an HPHT process, PDCs having a PCD table comprising such PCD, and methods of fabricating such PCD and PDCs. Such PCD may exhibit a thermal stability and/or wear resistance at least about equal to a shallow leached PCD material that has been fabricated without the use of graphite particles.

In an embodiment, a method of forming PCD or a PDC includes providing a mixture including graphite particles present in an amount of about 0.1 weight percent ("wt %") to about 20 wt % and diamond particles. The method further includes subjecting the mixture to an HPHT process to form the PCD.

In an embodiment, a method of forming a PDC comprises forming an assembly including a substrate, a first layer comprising a first mixture including graphite particles present in a first amount by weight and diamond particles, and a second layer disposed between the first layer and the substrate. The second layer comprises a second mixture including graphite particles present in a second amount by weight that is different than the first amount and diamond particles. The method further comprises subjecting the assembly to an HPHT process to form to a PCD table, from the first and second layers, which is bonded to the substrate.

In another embodiment, un-leached PCD includes a plurality of bonded diamond grains defining a plurality of interstitial regions. A metal-solvent catalyst occupies the plurality of interstitial regions. The un-leached PCD exhibits a thermal stability, due to the presence of graphite particles during manufacture, at least about equal to a PCD material fabricated without the presence of graphite particles.

In yet another embodiment, a PDC includes a substrate bonded to a PCD table. At least a portion of the PCD table may include un-leached PCD formed from any of the disclosed embodiments of PCD.

Further embodiments relate to applications utilizing the disclosed PCD and PDCs in various articles and apparatuses, such as rotary drill bits, bearing apparatuses, wire-drawing dies, machining equipment, and other articles and apparatuses.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PCD fabricated by subjecting a mixture including diamond particles and a selected amount of graphite particles to an HPHT process, PDCs having a PCD table comprising such PCD, and methods of fabricating such PCD and PDCs. Such PCD may exhibit a thermal stability and/or wear resistance at least about equal to a shallow leached PCD material that has been fabricated without the use of graphite particles. The embodiments of PCD and PDCs disclosed herein may be used in a variety of applications, such as rotary drill bits, bearing apparatuses, wire-drawing dies, machining equipment, and other articles and apparatuses.

Figure 1:
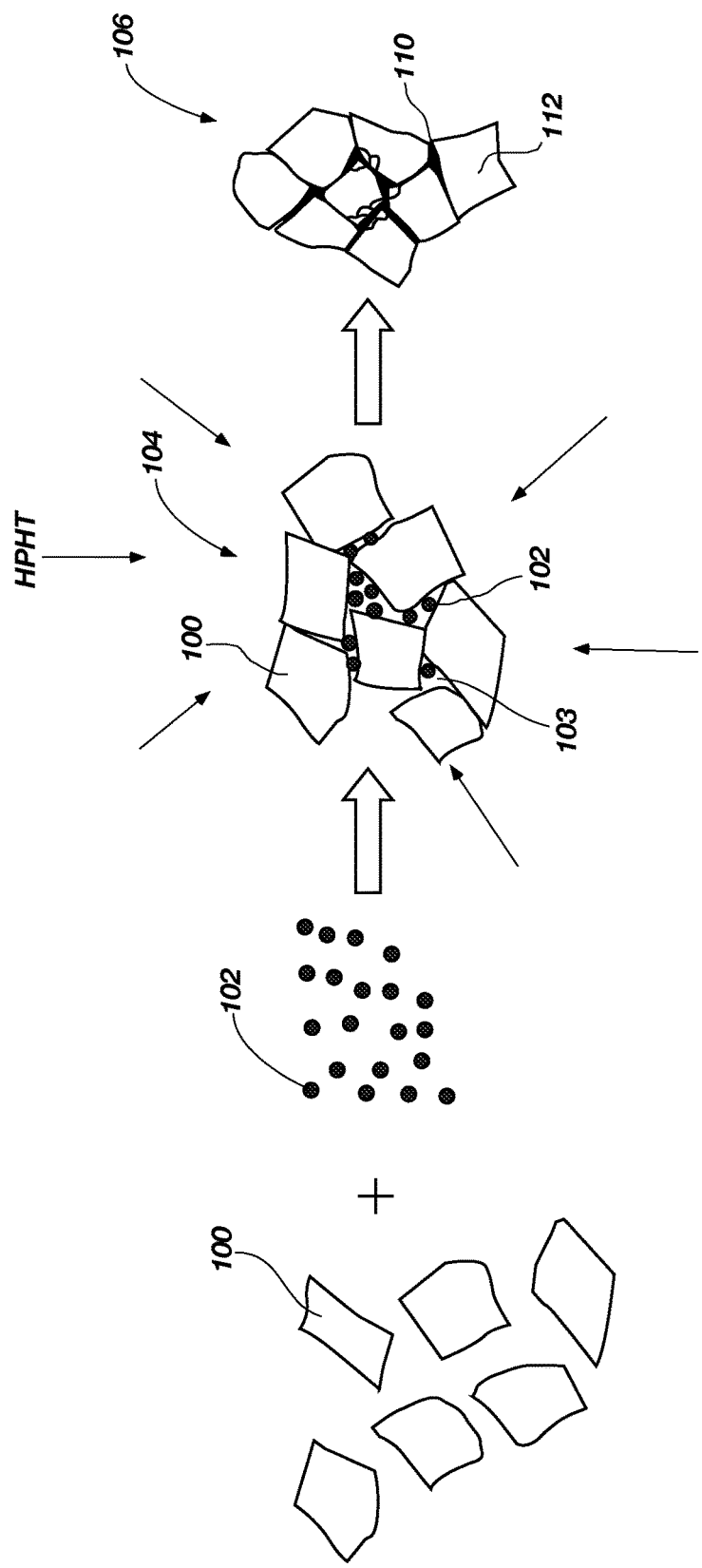
FIG. 1 is a schematic illustration of an embodiment of a method for fabricating PCD by subjecting a mixture of diamond particles and a selected amount of graphite particles to an HPHT process in the presence of a metal-solvent catalyst.

FIG. 1 is a schematic illustration of a method according to an embodiment of the invention for fabricating PCD. A plurality of diamond particles 100 may be mixed with a selected amount of graphite particles 102 to form a mixture 104 using any suitable mixing technique. The diamond particles 100 may exhibit any suitable average particle size, such as about submicron to about 100 µm, about 5 µm to about 75 µm, about 15 µm to about 25 µm, about 15 µm to about 20 µm, or another suitable average particle size. Furthermore, the particle size distribution of the diamond particles may exhibit a single mode, or may be a bimodal or greater particle size distribution.

The graphite particles 102 may be selected to be present in the mixture 104 in an amount of about 0.1 wt % to about 20 wt %, such as about 0.1 wt % to about 10 wt %, about 1 wt % to about 9 wt %, about 2 wt % to about 9 wt %, about 3 wt % to about 6 wt %, about 4.5 wt % to about 5.5 wt %, or about 5 wt %. In an embodiments, the graphite particles 102 may be selected to be present in the mixture 104 in an amount of about 0.1 wt % to about 0.8 wt %, such as about 0.1 wt % to about 0.50 wt %. The graphite particles 102 may exhibit an average particle size of about 1 µm to about 5 µm (e.g., about 1 µm to about 3 µm) so that one or more of the graphite particles 102 may fit into interstitial regions 103 defined by the plurality of diamond particles 100. According to various embodiments, the graphite particles 102 may be crystalline graphite particles, amorphous graphite particles, synthetic graphite particles, or combinations thereof. The term "amorphous graphite" refers to naturally occurring microcrystalline graphite. Crystalline graphite particles may be naturally occurring or synthetic. Various types of graphite particles are commercially available from Ashbury Graphite Mills of Kittanning, Pa.

The mixture 104 may be subjected to an HPHT process in the presence of a partially or completely liquefied metal-solvent catalyst (e.g., iron, nickel, cobalt, or alloys of the foregoing) to sinter the diamond particles 100 and form PCD 106 comprising a plurality of bonded diamond grains 108 defining interstitial regions having a metal-solvent catalyst 110 disposed therein. The bonded diamond grains 108 are bonded to each other via diamond-to-diamond bonding. For example, the metal-solvent catalyst may be provided in particulate form and mixed with the diamond and graphite particles of the mixture 104, infiltrated from a thin plate of metal-solvent catalyst placed adjacent to the mixture 104, infiltrated from a cemented-carbide substrate including metal-solvent catalyst therein, or combinations of the foregoing. The graphite particles 102 are believed to be displaced into the interstitial regions between the diamond particles 100 under the compressive stresses applied to the mixture 104 during the HPHT process.

Because of the high solubility of the graphite particles 102 in the liquefied metal-solvent catalyst, the graphite particles 102 dissolve in the liquefied metal-solvent catalyst during the HPHT process and form diamond grains between the existing diamond particles. Thus, including non-diamond carbon material in the mixture 104, such as the graphite particles 102, promotes increasing the diamond-to-diamond bond density in the PCD 106 so-formed compared to if the graphite particles 102 were absent from the mixture 104. Including non-diamond carbon material in the mixture 104, such as the graphite particles 102, further promotes reducing the amount of metal-solvent catalyst 110 remaining in the PCD 106 when the metal-solvent catalyst 110 is infiltrated into the mixture 104 compared to if the graphite particles 102 were not present in the mixture 104. In some embodiments, the PCD 106 may include a measurable, residual amount of graphite that is not converted to diamond during the HPHT process. For example, the residual amount of graphite may be about 0.01 wt % to about 0.3 wt %, such as less than about 0.1 wt %.

In order to efficiently HPHT process the mixture 104, the mixture 104 may be placed in a pressure transmitting medium, such as a refractory metal can, graphite structure, pyrophyllite and/or other pressure transmitting structure. The pressure transmitting medium, including the mixture 104 and metal-solvent catalyst, may be subjected to a HPHT process using an ultra-high pressure press at a temperature of at least about 1000° Celsius (e.g., about 1100° Celsius to about 2200° Celsius) and a pressure of at least about 40 kilobar (e.g., about 50 kilobar to about 100 kilobar) for a time sufficient to at least partially convert the graphite particles 102 to diamond, consolidate the mixture 104, and sinter the diamond particles 100 to form the PCD 106.

Figure 2:
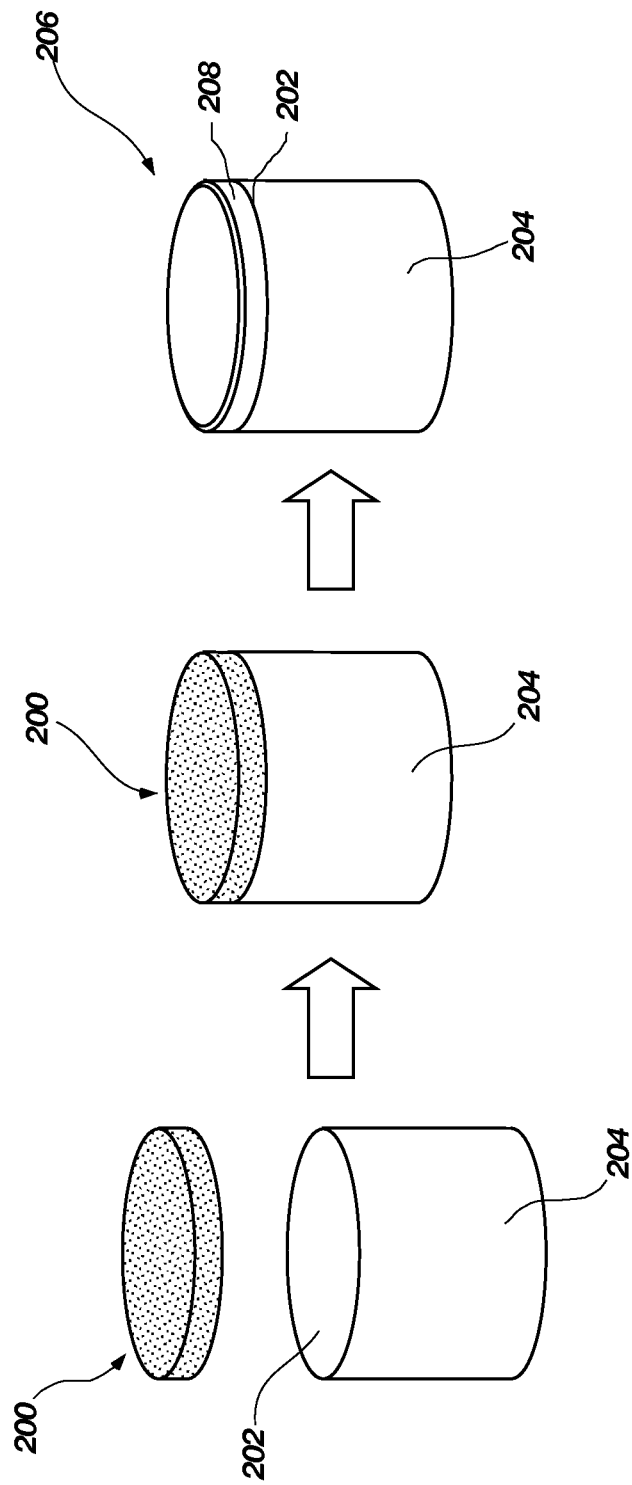
FIG. 2 is a schematic illustration of a method of fabricating a PDC according to an embodiment.

FIG. 2 is a schematic illustration of an embodiment of a method for fabricating a PDC. Referring to FIG. 2, a layer 200 comprising the mixture 104 that includes the diamond particles 100 and graphite particles 102 may be positioned adjacent to an interfacial surface 202 of a substrate 204. The substrate 204 may be generally cylindrical or another selected configuration, without limitation. Although the interfacial surface 202 is illustrated as being substantially planar, the interfacial surface 202 may exhibit a selected non-planar topography, without limitation. The substrate 204 may include a metal-solvent catalyst, such as cobalt in cobalt-cemented tungsten carbide. Other materials that may be used for the substrate 204 include cemented carbides, such as titanium carbide, niobium carbide, chromium carbide, tantalum carbide, vanadium carbide, or combinations of any of the preceding carbides cemented with cobalt, iron, nickel, or alloys thereof.

Figure 3:
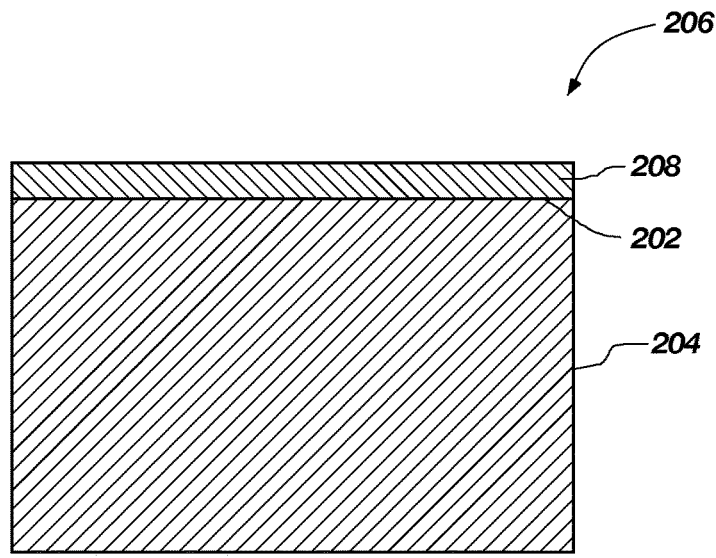
FIG. 3 is a cross-sectional view of a PDC formed according to an embodiment of a method described with respect to FIG. 1.

Still referring to FIG. 2, the layer 200 and substrate 204 may be subjected to a HPHT process using pressure and temperature conditions described above for forming the PCD 106 (FIG. 1). A PDC 206 so-formed includes an un-leached PCD table 208 that comprises PCD having a structure similar to or the same as the PCD embodiments described herein (e.g., the PCD 106), integrally formed with the substrate 204 and bonded to the interfacial surface 202 of the substrate 204. A cross-sectional view of the PDC 206 is shown in FIG. 3.

The HPHT process may be performed at a temperature sufficient to partially or completely liquefy a constituent (i.e., an infiltrant) of the substrate 204 that infiltrates into the layer 200 comprising the mixture 108. For example, the infiltrant may be a metal-solvent catalyst (e.g., iron, nickel, cobalt, or alloys of the foregoing) that functions as a cementing constituent in a cemented carbide substrate. In such an embodiment, the metal-solvent catalyst is liquefied during the HPHT process and sweeps into the layer 200 at least partially dissolving the graphite particles 102 therein and promoting formation of PCD to form the PCD table 208.

In other embodiments, the PCD table 208 may be separately formed using a HPHT sintering process and, subsequently, bonded to the interfacial surface 202 of the substrate 204 by brazing, using a separate HPHT bonding process, or any other suitable joining technique, without limitation. In yet another embodiment, the substrate may be formed by depositing a binderless carbide (e.g., tungsten carbide) via chemical vapor deposition onto the separately formed PCD table. For example, U.S. Patent Application Publication US20080085407, the disclosure of which is incorporated herein, in its entirety, by this reference discloses various techniques and embodiments relating to a binderless carbide on a PCD table.

According an embodiment, the thermal stability of the PCD table 208 bonded to the substrate 204 may be increased by depleting metal-solvent catalyst present in the PCD table to a selected depth via an acid leaching process, such as a depth of about 10 μm to about 100 μm. In other embodiments, the metal-solvent catalyst present in the PCD table 208 to the substrate 204 may be acid leached to remove substantially all of the metal-solvent catalyst from the PCD table 208. The PCD table 208 is relatively more resistant to removal of the metal-solvent catalyst therein by leaching compared to if the PCD table 208 was not partially formed from graphite particles. It is believed by the inventor that the leaching resistance of the PCD table 208 is due to a relatively small interstitial region size and/or increased diamond-to-diamond bond density compared to if the PCD table 208 was not sintered in the presence of graphite particles.

Figure 4:
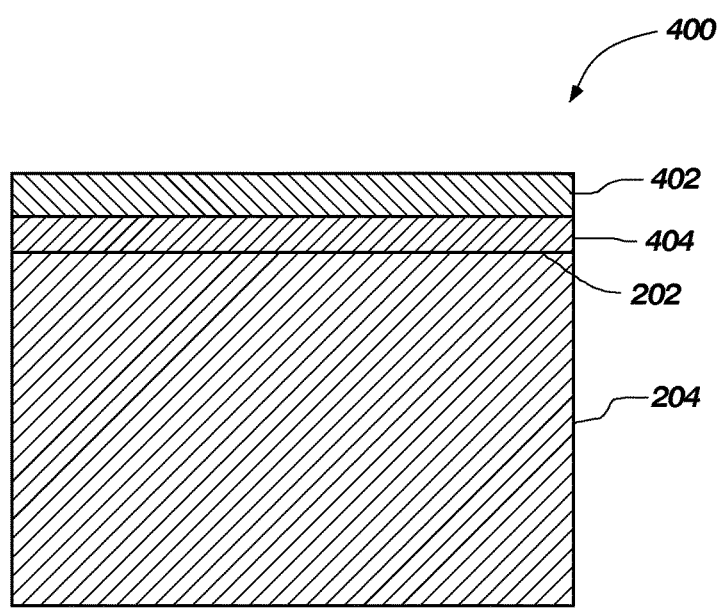
FIG. 4 is a cross-sectional view of an embodiment of an assembly to be HPHT processed for forming a PDC that includes two or more layers each comprising diamond and graphite particles, with the amount of graphite particles decreasing with distance away from the substrate.

FIG. 4 is a cross-sectional view of an embodiment of an assembly 400 for forming a PDC that includes two or more layers that each comprises a mixture of diamond and graphite particles, with the amount of graphite particles decreasing with distance away from a substrate. The assembly 400 includes a substrate 204 and a layer 402 comprising a mixture of graphite particles present in a first amount by weight and diamond particles. The assembly 400 further includes a layer 404 disposed between the layer 402 and substrate 204. The layer 404 comprises a mixture of graphite particles present in a second amount by weight greater than the first amount and diamond particles.

In one embodiment, the second amount of graphite particles may be about 4 to about 5 times the first amount of graphite particles. In an embodiment, the first amount of graphite particles may be about 1 wt % to about 5 wt % and the second amount of graphite particles may be about 5 wt % to about 25 wt %. In a more specific embodiment, the first amount of graphite particles may be about 5 wt % and the second amount of graphite particles may be about 20 wt % to about 25 wt %. In another embodiment, at least a third layer (not shown) may be disposed between the second layer 404 and substrate 204 that comprises a mixture of graphite particles present in a third amount by weight greater than the second amount and diamond particles.

The assembly 400 may be subjected to a HPHT process using pressure and temperature conditions described above for forming the PCD 106 (FIG. 1). During the HPHT process, a metal-solvent catalyst from the substrate 204 may be liquefied and infiltrate into the layers 402 and 404 to dissolve the graphite particles and promote forming PCD. In the illustrated embodiment, the metal-solvent catalyst is provided from the substrate 204. However, in another embodiment, the metal-solvent catalyst may be provided, for example, by a thin plate of metal-solvent catalyst positioned between the layer 404 and substrate 204.

Figure 5:
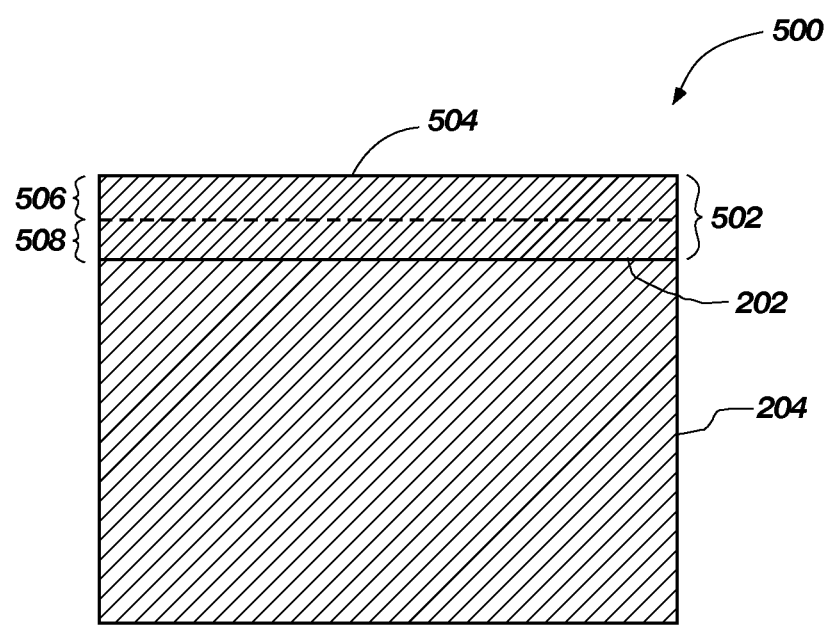
FIG. 5 is a cross-sectional view of the PDC formed after HPHT processing the assembly shown in FIG. 4.

FIG. 5 is a cross-sectional view of a PDC 500 formed after HPHT processing the assembly 400 shown in FIG. 4. The PDC 500 includes an un-leached PCD table 502 integrally formed with the substrate 204 and bonded to the interfacial surface 202 of the substrate 204. The PCD table 502 includes a working or cutting surface 504. The PCD table 502 includes a first region 506 that functions as a cutting or working region remote from the substrate 204 formed from the layer 402 and a second region 508 adjacent to the substrate 204 formed from the layer 404. Because the layer 404 included more graphite content than the layer 402, the second region 508 formed therefrom exhibits a greater thermal stability and lower wear resistance than the first region 506. It is currently believed by the inventor that the second region 508 exhibits a greater thermal stability than the first region 506 because it has a higher thermal conductivity than the first region 506 due to the presence of relatively larger diamond grains in the second region 508 from conversion of the higher second amount of graphite particles in the layer 404 and relatively less metal-solvent catalyst in the second region 508. Additionally, the second region 508 may exhibit a measurable, greater residual amount of graphite that is not converted to diamond during HPHT processing and a greater diamond-to-diamond bond density than the first region 506 of the PCD table 502 due to the relatively greater amount of graphite particle in the layer 404 from which it is formed.

In the illustrated embodiment shown in FIG. 4, the first layer 402 is positioned remote from the substrate 204. However, in another embodiment, the first layer 402 may be positioned between the second layer 404 and the substrate 204.

The PCD 106 (FIG. 1), PCD table 208 (FIG. 2), and PCD table 502 (FIG. 5) may each exhibit a thermal stability that is close to, substantially the same as, or greater than leached PCD (e.g., a leached PCD table). The leached PCD may be fabricated by subjecting diamond particles (without the presence of graphite particles) having the same or similar diamond particle size distribution as the diamond particle size distribution used to form the PCD 106, PCD table 208, and PCD table 502 in the presence of a metal-solvent catalyst to the same or similar HPHT process conditions used to manufacture the PCD 106, PCD table 208, and PCD table 502, with the metal-solvent catalyst being depleted (e.g., substantially removed) to a depth of less than about 100 µm (e.g., about 70 µm to about 90 µm) after HPHT processing. It is currently believed by the inventor that the use of a selected amount of graphite particles in the manufacture of the PCD 106, PCD table 208, and PCD table 502 may result in the PCD 106, PCD table 208, and PCD table 502 exhibiting increased diamond-to-diamond bond density, increased density, and/or less metal-solvent catalyst compared to such leached PCD. Thus, despite the presence of metal-solvent catalyst in the PCD 106, PCD table 208, and PCD table 502, they may still exhibit a thermal stability about equal to or greater than leached PCD in which the metal-solvent catalyst has been shallow leached.

The thermal stability of the PCD and the PCD tables disclosed herein may be evaluated by measuring the distance cut in a workpiece prior to catastrophic failure, without using coolant, in a vertical lathe test (e.g., vertical turret lathe or a vertical boring mill). An example of suitable parameters that may be used to determine thermal stability of the PCD are a depth of cut for the PCD cutting element of about 1.27 mm, a back rake angle for the PCD cutting element of about 20 degrees, an in-feed for the PCD cutting element of about 1.524 mm/rev, a cutting speed of the workpiece to be cut of about 1.78 m/sec, and the workpiece may be made from Barre granite having a 914 mm outer diameter and a 254 mm inner diameter. In an embodiment, the distance cut in a workpiece prior to catastrophic failure as measured in the above-described vertical lathe test may be at least about 3050 feet, such as about 3250 feet to about 5000 feet.

Figure 10:
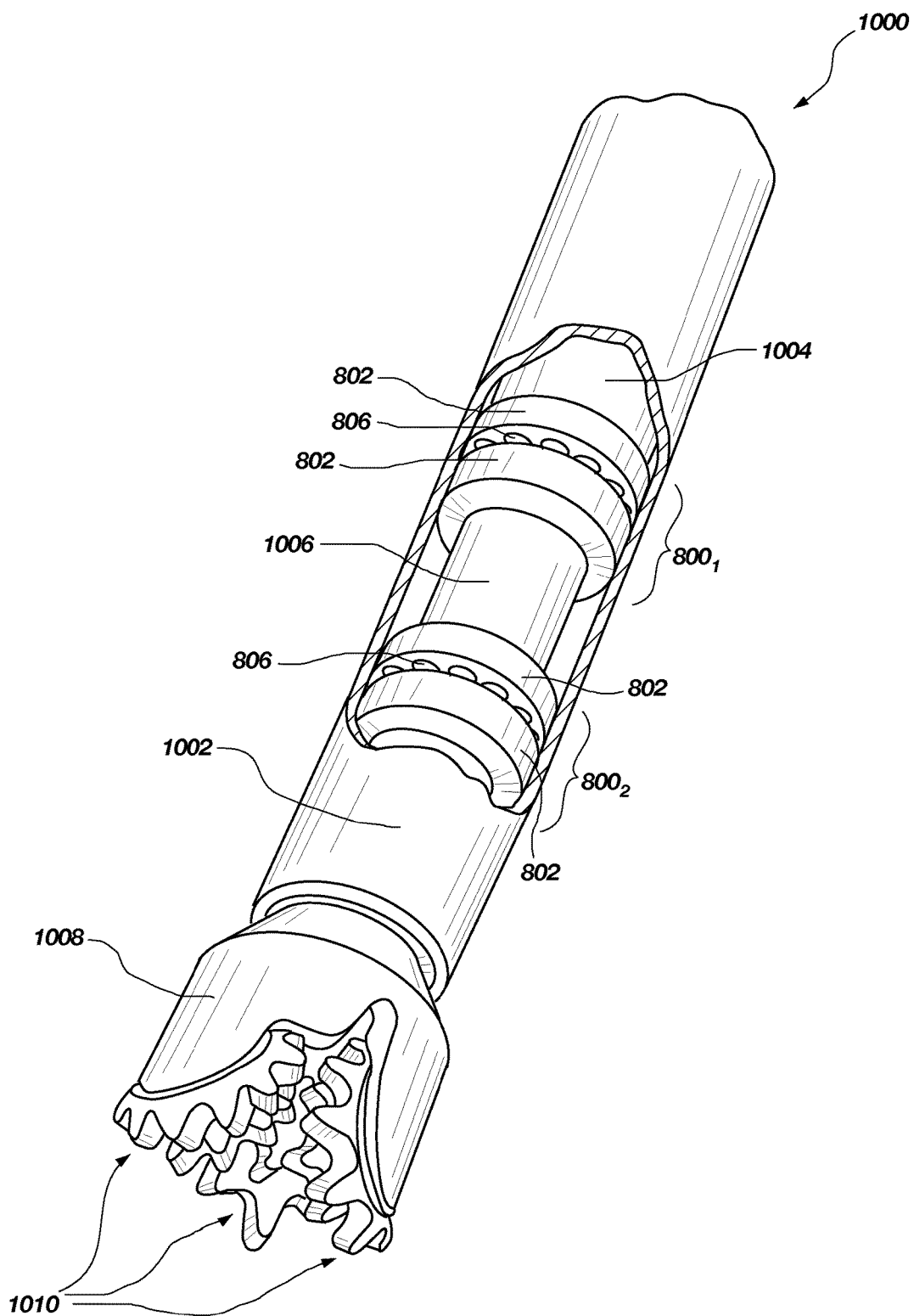
FIG. 10 is a schematic isometric cut-away view of an embodiment of a subterranean drilling system including the thrust-bearing apparatus shown in FIG. 8.
Figure 11:
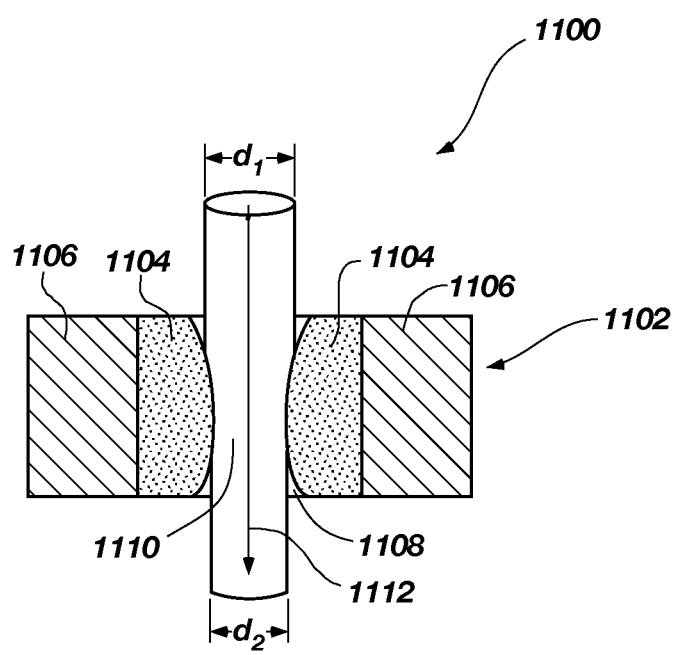
FIG. 11 is a side cross-sectional view of an embodiment of a wire-drawing die that employs a PDC fabricated in accordance with the principles described herein.

The disclosed embodiments of PDCs and PCD may be used in a number of different applications including, but not limited to, use in a rotary drill bit (FIGS. 6 and 7), a thrust-bearing apparatus (FIG. 8), a radial bearing apparatus (FIG. 9), a subterranean drilling system (FIG. 10), and a wire-drawing die (FIG. 11). It should be emphasized that the various applications discussed above are merely some examples of applications in which the PDC and PCD embodiments may be used. Other applications are contemplated, such as employing the disclosed PDC and PCD embodiments in friction stir welding tools.

Figure 6:
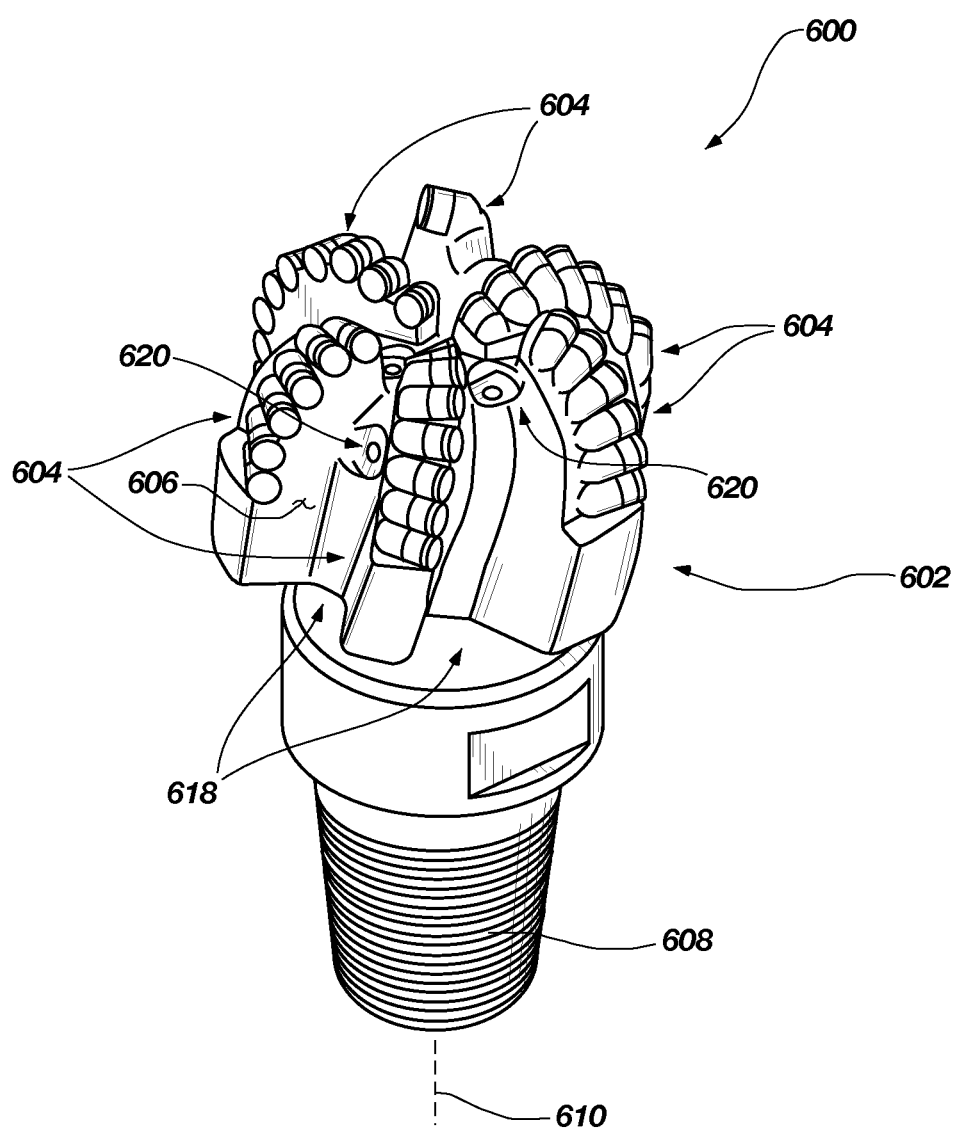
FIG. 6 is an isometric view of an embodiment of a rotary drill bit that may employ one or more of the disclosed PDC embodiments.
Figure 7:
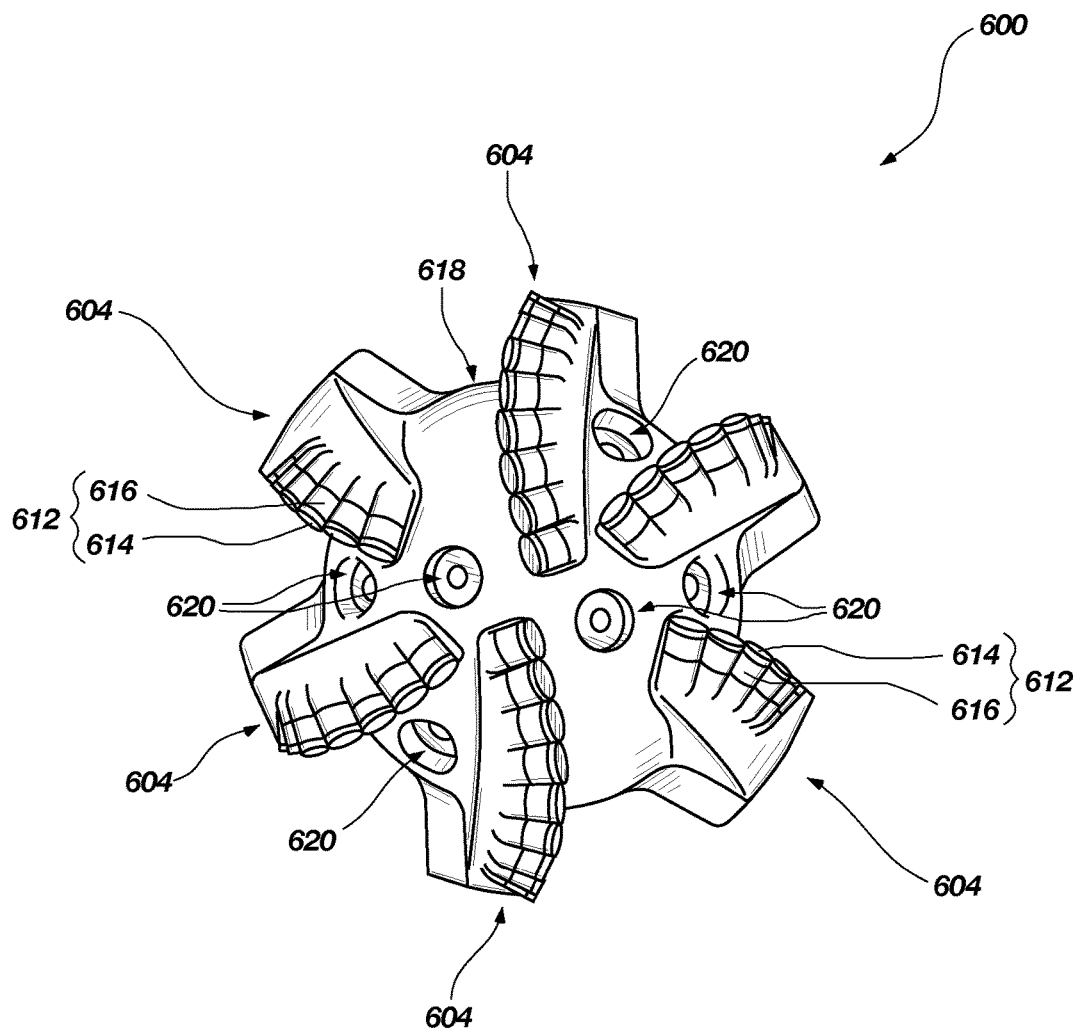
FIG. 7 is a top elevation view of the rotary drill bit shown in FIG. 6.

FIG. 6 is an isometric view and FIG. 7 is a top elevation view of an embodiment of a rotary drill bit 600. The rotary drill bit 600 includes at least one PDC configured according to any of the previously described PDC embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure for drilling into a subterranean formation by rotation about a longitudinal axis 610 and application of weight-on-bit. At least one PDC cutting element, configured according to any of the previously described PDC embodiments (e.g., the PDC 206 shown in FIG. 2 or the PDC 500 shown in FIG. 5), may be affixed to the bit body 602. With reference to FIG. 7, a plurality of PDCs 612 are secured to the blades 604. For example, each PDC 612 may include a PCD table 614 bonded to a substrate 616. More generally, the PDCs 612 may comprise any PDC disclosed herein, without limitation. In addition, if desired, in some embodiments, a number of the PDCs 612 may be conventional in construction. Also, circumferentially adjacent blades 604 define so-called junk slots 618 therebetween, as known in the art. Additionally, the rotary drill bit 600 may include a plurality of nozzle cavities 620 for communicating drilling fluid from the interior of the rotary drill bit 600 to the PDCs 612.

FIGS. 6 and 7 merely depict one embodiment of a rotary drill bit that employs at least one cutting element that comprises a PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PCD and/or PDCs disclosed herein (e.g., the PDC 200 shown in FIG. 2) may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 8:
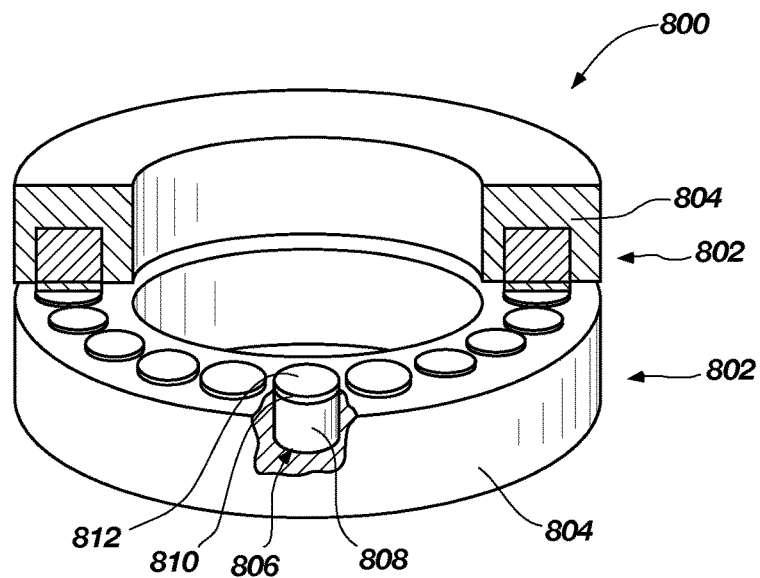
FIG. 8 is an isometric cut-away view of an embodiment of a thrust-bearing apparatus that may utilize one or more of the disclosed PDC embodiments.

FIG. 8 is an isometric cut-away view of an embodiment of a thrust-bearing apparatus 800, which may utilize any of the disclosed PDC embodiments as bearing elements. The thrust-bearing apparatus 800 includes respective thrust-bearing assemblies 802. Each thrust-bearing assembly 802 includes an annular support ring 804 that may be fabricated from a material, such as carbon steel, stainless steel, or another suitable material. Each support ring 804 includes a plurality of recesses (not labeled) that receives a corresponding bearing element 806. Each bearing element 806 may be mounted to a corresponding support ring 804 within a corresponding recess by brazing, press-fitting, using fasteners, or another suitable mounting technique. One or more, or all of bearing elements 806 may be configured according to any of the disclosed PDC embodiments. For example, each bearing element 806 may include a substrate 808 and a PCD table 810, with the PCD table 810 including a bearing surface 812.

In use, the bearing surfaces 812 of one of the thrust-bearing assemblies 802 bears against the opposing bearing surfaces 812 of the other one of the bearing assemblies 802. For example, one of the thrust-bearing assemblies 802 may be operably coupled to a shaft to rotate therewith and may be termed a "rotor." The other one of the thrust-bearing assemblies 802 may be held stationary and may be termed a "stator."

Figure 9:
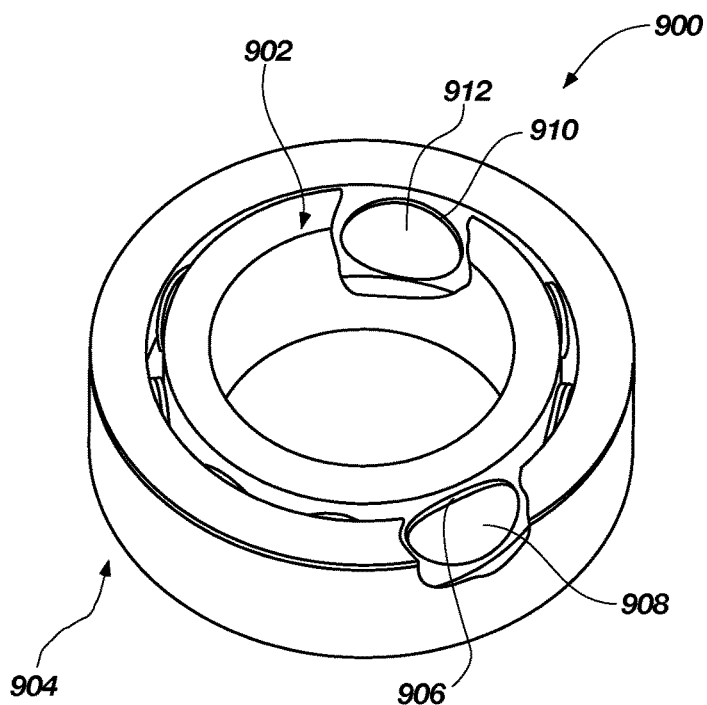
FIG. 9 is an isometric cut-away view of an embodiment of a radial bearing apparatus that may utilize one or more of the disclosed PDC embodiments.

FIG. 9 is an isometric cut-away view of an embodiment of a radial bearing apparatus 900, which may utilize any of the disclosed PDC embodiments as bearing elements. The radial bearing apparatus 900 includes an inner race 902 positioned generally within an outer race 904. The outer race 904 includes a plurality of bearing elements 906 affixed thereto that have respective bearing surfaces 908. The inner race 902 also includes a plurality of bearing elements 910 affixed thereto that have respective bearing surfaces 912. One or more, or all of the bearing elements 906 and 910 may be configured according to any of the PDC embodiments disclosed herein. The inner race 902 is positioned generally within the outer race 904 and, thus, the inner race 902 and outer race 904 may be configured so that the bearing surfaces 908 and 912 may at least partially contact one another and move relative to each other as the inner race 902 and outer race 904 rotate relative to each other during use.

The radial-bearing apparatus 900 may be employed in a variety of mechanical applications. For example, so-called "roller cone" rotary drill bits may benefit from a radial-bearing apparatus disclosed herein. More specifically, the inner race 902 may be mounted or affixed to a spindle of a roller cone and the outer race 904 may be affixed to an inner bore formed within a cone and that such an outer race 904 and inner race 902 may be assembled to form a radial-bearing apparatus.

Referring to FIG. 10, the thrust-bearing apparatus 800 and/or radial bearing apparatus 900 may be incorporated in a subterranean drilling system. FIG. 10 is a schematic isometric cut-away view of a subterranean drilling system 1000 that includes at least one of the thrust-bearing apparatuses 800 shown in FIG. 8 according to another embodiment. The subterranean drilling system 1000 includes a housing 1002 enclosing a downhole drilling motor 1004 (i.e., a motor, turbine, or any other device capable of rotating an output shaft) that is operably connected to an output shaft 1006. A first thrust-bearing apparatus 800$_1$ (FIG. 8) is operably coupled to the downhole drilling motor 1004. A second thrust-bearing apparatus 800$_2$ (FIG. 8) is operably coupled to the output shaft 1006. A rotary drill bit 1008 configured to engage a subterranean formation and drill a borehole is connected to the output shaft 1006. The rotary drill bit 1008 is shown as a roller cone bit including a plurality of roller cones 1010. However, other embodiments may utilize different types of rotary drill bits, such as a so-called "fixed cutter" drill bit shown in FIGS. 6 and 7. As the borehole is drilled, pipe sections may be connected to the subterranean drilling system 1000 to form a drill string capable of progressively drilling the borehole to a greater depth within the earth.

A first one of the thrust-bearing assemblies 802 of the thrust-bearing apparatus 800$_1$ is configured as a stator that does not rotate and a second one of the thrust-bearing assemblies 802 of the thrust-bearing apparatus 800$_1$ is configured as a rotor that is attached to the output shaft 1006 and rotates with the output shaft 1006. The on-bottom thrust generated when the drill bit 1008 engages the bottom of the borehole may be carried, at least in part, by the first thrust-bearing apparatus 800$_1$. A first one of the thrust-bearing assemblies 802 of the thrust-bearing apparatus 800$_2$ is configured as a stator that does not rotate and a second one of the thrust-bearing assemblies 802 of the thrust-bearing apparatus 800$_2$ is configured as a rotor that is attached to the output shaft 1006 and rotates with the output shaft 1006. Fluid flow through the power section of the downhole drilling motor 1004 may cause what is commonly referred to as "off-bottom thrust," which may be carried, at least in part, by the second thrust-bearing apparatus 800$_2$.

In operation, drilling fluid may be circulated through the downhole drilling motor 1004 to generate torque and effect rotation of the output shaft 1006 and the rotary drill bit 1008 attached thereto so that a borehole may be drilled. A portion of the drilling fluid may also be used to lubricate opposing bearing surfaces of the bearing elements 806 of the thrust-bearing assemblies 802.

FIG. 11 is a side cross-sectional view of an embodiment of a wire-drawing die 1100 that employs a PDC 1102 fabricated in accordance with the teachings described herein. The PDC 1102 includes an inner, annular PCD region 1104 comprising any of the PCD tables described herein that is bonded to an outer cylindrical substrate 1106 that may be made from the same materials as the substrate 102 shown in FIG. 1. The PCD region 1104 also includes a die cavity 1108 formed therethrough configured for receiving and shaping a wire being drawn. The wire-drawing die 1100 may be encased in a housing (e.g., a stainless steel housing), which is not shown, to allow for handling.

In use, a wire 1110 of a diameter $d_1$ is drawn through die cavity 1108 along a wire drawing axis 1112 to reduce the diameter of the wire 1110 to a reduced diameter $d_2$.

The following working examples set forth various formulations for forming PDCs. The following working examples provide further detail in connection with the specific embodiments described above.

Comparative Example 1

A layer of diamond particles having an average grain size of about 15.3 μm was placed adjacent to a cobalt-cemented tungsten carbide substrate. The layer and substrate were placed in a niobium can and subjected to HPHT conditions in a HPHT press at a temperature of about 1400° Celsius and a pressure of about 5 GPa to about 8 GPa to form a conventional PDC including a PCD table integrally formed and bonded to the substrate. Cobalt was infiltrated into the layer of diamond particles from the substrate catalyzing the formation of the PCD table. The thickness of the PCD table of the PDC was 0.0823 inch and a 0.01145 inch chamfer was machined in the PCD table.

Figure 12:
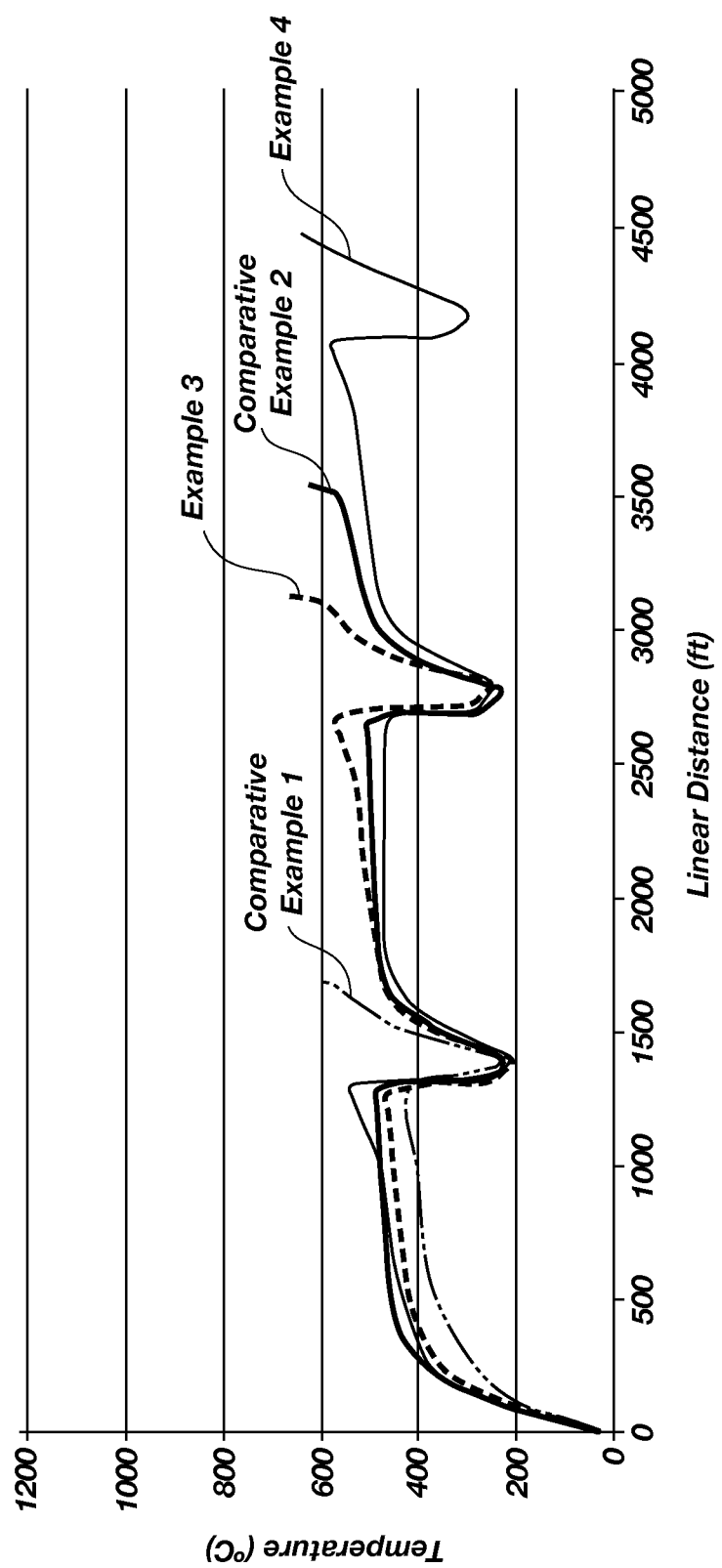
FIG. 12 is a graph showing the measured temperature versus linear distance during a vertical turret lathe test on conventional PDCs of comparative working examples 1 and 2 and PDCs according to working examples 3 and 4 of the invention.

The thermal stability of the conventional PDC so-formed of comparative example 1 was evaluated by measuring the distance cut in a Barre granite workpiece prior to failure, without using coolant, in a vertical turret lathe test. The distance cut is considered representative of the thermal stability of the PDC. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece has outer diameter of about a 914 mm and an inner diameter of about a 254 mm. Referring to FIG. 12, the conventional PDC of comparative example 1 was able to cut a distance of about 1600 linear feet in the workpiece prior to failure.

Comparative Example 2

A layer of diamond particles having an average grain size of about 15.3 μm was placed adjacent to a cobalt-cemented tungsten carbide substrate. The layer and substrate were placed in a niobium can and subjected to HPHT conditions in a HPHT press at a temperature of about 1400° Celsius and a pressure of about 5 GPa to about 8 GPa to form a conventional PDC including a PCD table integrally formed and bonded to the substrate. Cobalt was infiltrated into the layer of diamond particles from the substrate catalyzing the formation of the PCD table. The thickness of the PCD table of the PDC was 0.090 inch and a 0.012 inch chamfer was machined in the PCD table. The PCD table was acid leached to a depth believed to be about 70 μm to about 90 μm.

The thermal stability of the conventional PDC so-formed of comparative example 2 was evaluated by measuring the distance cut in the same Barre granite workpiece used to test comparative example 1 prior to failure, without using coolant, in a vertical turret lathe test. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece has outer diameter of about a 914 mm and an inner diameter of about a 254 mm. Referring to FIG. 12, the conventional PDC of comparative example 2 was able to cut a distance of about 3500 linear feet in the workpiece prior to failure.

Example 3

A PDC was fabricated in accordance with the principles of the embodiment described with respect to FIG. 2. A layer of a mixture including diamond particles having an average grain size of about 15.3 µm present in an amount of about 95 wt % and graphite particles having an average particle size of about 3 µm present in an amount of about 5 wt % was formed. The layer of the mixture was placed adjacent to a cobalt-cemented tungsten carbide substrate. The layer and substrate were placed in a niobium can and subjected to HPHT conditions in a HPHT press at a temperature of about 1400° Celsius and a pressure of about 5 GPa to about 8 GPa to form a PDC including a PCD table integrally formed and bonded to the substrate. Cobalt was infiltrated into the layer of diamond particles from the substrate catalyzing the formation of the PCD table. The thickness of the PCD table of the PDC was 0.090 inch and a 0.012 inch chamfer was machined in the PCD table.

The thermal stability of the PDC so-formed of example 3 was evaluated by measuring the distance cut in the same Barre granite workpiece used to test comparative example 1 prior to failure, without using coolant, in a vertical turret lathe test. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece has outer diameter of about a 914 mm and an inner diameter of about a 254 mm. Referring to FIG. 12, the PDC of example 3 was able to cut a distance of about 3200 linear feet in the workpiece prior to failure, which indicates that the PCD table of example 3 is significantly more thermally stable than the PCD table of comparative example 1 and about as thermally stable as the leached PCD table of comparative example 2 despite the PCD table of example 3 having not been leached to remove cobalt therefrom.

Example 4

A PDC was fabricated in accordance with the principles of the embodiment described with respect to FIG. 2. A layer of a mixture including diamond particles having an average grain size of about 15.3 µm present in an amount of about 95 wt % and graphite particles having an average particle size of about 3 µm present in an amount of about 5 wt % was formed. The layer of the mixture was placed adjacent to a cobalt-cemented tungsten carbide substrate. The layer and substrate were placed in a niobium can and subjected to HPHT conditions in a HPHT press at a temperature of about 1400° Celsius and a pressure of about 5 GPa to about 8 GPa to form a PDC including a PCD table integrally formed and bonded to the substrate. Cobalt was infiltrated into the layer of diamond particles from the substrate catalyzing the formation of the PCD table. The thickness of the PCD table of the PDC was 0.090 inch and a 0.012 inch chamfer was machined in the PCD table. The PCD table was acid leached to a depth of about 30 µm to about 40 µm.

The thermal stability of the PDC so-formed of example 4 was evaluated by measuring the distance cut in the same Barre granite workpiece used to test comparative example 1 prior to failure, without using coolant, in a vertical turret lathe test. The test parameters were a depth of cut for the PDC of about 1.27 mm, a back rake angle for the PDC of about 20 degrees, an in-feed for the PDC of about 1.524 mm/rev, a cutting speed of the workpiece to be cut of about 1.78 m/sec, and the workpiece has outer diameter of about a 914 mm and an inner diameter of about a 254 mm. Referring to FIG. 12, the PDC of example 4 was able to cut a distance of about 4500 linear feet in the workpiece prior to failure, indicating that the PCD table of example 4 is significantly more thermally stable than the PCD tables of comparative example 1, comparative example 2, and example 3.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

The invention claimed is:
1. A polycrystalline diamond compact, comprising:
   a cemented carbide substrate; and
   a polycrystalline diamond ("PCD") table bonded to the cemented carbide substrate, the PCD table manufactured by a method including:
      forming an assembly including the cemented carbide substrate, and a first mixture adjacent to at least a second mixture;
      wherein the first mixture includes graphite particles present in a first amount mixed with diamond particles, and the at least a second mixture includes additional diamond particles mixed with additional graphite particles present in a second amount greater than the first amount; and
      subjecting the assembly to a high-pressure/high-temperature process in the presence of a catalyst to form the PCD table including a first region formed from the first mixture and a second region formed from the second mixture, the PCD table including a matrix of bonded diamond grains exhibiting diamond-to-diamond bonding therebetween and defining a plurality of interstitial regions, the catalyst being disposed in at least some of the plurality of interstitial regions.

2. The polycrystalline diamond compact of claim 1 wherein the second region of the PCD table is positioned between the cemented carbide substrate and the first region of the PCD table.

3. The polycrystalline diamond compact of claim 1 wherein the first region of the PCD table is positioned between the cemented carbide substrate and the second region of the PCD table.

4. The polycrystalline diamond compact of claim 1 wherein the second region of the PCD table is more thermally stable than the first region of the PCD table.

5. The polycrystalline diamond compact of claim 1 wherein the second region of the PCD table has a higher thermal conductivity than the first region of the PCD table.

6. The polycrystalline diamond compact of claim 1 wherein the second region of the PCD table is more thermally stable than the first region of the PCD table, wherein the second region of the PCD table has a higher thermal conductivity than the first region of the PCD table.

\* \* \* \* \*